United States Patent [19]

Kamada et al.

[11] 4,025,439

[45] May 24, 1977

[54] DRIED SEMIPERMEABLE MEMBRANE AND MANUFACTURE THEREOF

[75] Inventors: Kensuke Kamada; Shunsuke Minami, both of Otake, Japan

[73] Assignee: Mitsubishi Rayon Co., Ltd., Tokyo, Japan

[22] Filed: Oct. 9, 1975

[21] Appl. No.: 621,076

Related U.S. Application Data

[63] Continuation-in-part of Ser. No. 532,159, Dec. 12, 1974, abandoned.

[30] Foreign Application Priority Data

Dec. 12, 1973    Japan ........................... 48-141465

[52] U.S. Cl. .................... 210/500 M; 264/41; 264/49; 264/206; 264/234; 264/345
[51] Int. Cl.² .......................................... B01D 13/04
[58] Field of Search .......... 264/234, 345, 182, 206, 264/41, 49, 178 R, 299; 210/500 M

[56] References Cited

UNITED STATES PATENTS

| | | | |
|---|---|---|---|
| 2,649,427 | 8/1953 | Marvel | 264/182 |
| 3,567,810 | 3/1971 | Baker | 264/41 |
| 3,615,024 | 10/1971 | Michaels | 210/500 M |
| 3,616,930 | 11/1971 | Muir | 210/500 M |
| 3,718,722 | 2/1973 | Lee | 264/41 |
| 3,822,330 | 7/1974 | Muir et al. | 264/41 |
| 3,917,777 | 11/1975 | Asada et al. | 264/41 |
| 3,933,653 | 1/1976 | Hashino et al. | 264/41 |

FOREIGN PATENTS OR APPLICATIONS 1,327,990    8/1973    United Kingdom ................ 264/41

OTHER PUBLICATIONS

"Drying Cellulose Acetate Membranes,"–Vos et al., I & EC Product Research and Development, vol. 8, No. 1, Mar. 1969, pp. 84–89.

"R & D of New Polymer Systems for R.O. Membranes," Saltonstall et al., Research & Development Progress Report No. 167, 2-1966, pp. 9–10.

*Primary Examiner*—Jeffery R. Thurlow
*Attorney, Agent, or Firm*—Oblon, Fisher, Spivak, McClelland & Maier

[57] ABSTRACT

Dry semipermeable membranes of polyacrylonitrile or copolymers containing more than 65 wt. % of acrylonitrile are prepared by dissolving the polymer in a solvent in a solids concentration of 15–30% by weight; uniformly coating the solution onto a surface in a desired shape under an atmosphere whose relative humidity is 60–85% and dipping said coated surface into a non-solvent medium so as to remove the solvent which forms the membrane; heat-treating the membrane under moist conditions at 60°–90° C; and drying the membrane at a temperature less than the temperature of the heat treatment under conditions such that the coefficient of contraction is less than 1%, whereby a dried semi-permeable membrane having an open-celled structure with a pore size of a diameter less than 0.5 $\mu$ and a porosity of 0.40–0.7 is obtained.

12 Claims, No Drawings

DRIED SEMIPERMEABLE MEMBRANE AND MANUFACTURE THEREOF

CROSS REFERENCE TO RELATED APPLICATIONS

This application is a continuation-in-part of application Ser. No. 532,159, filed Dec. 12, 1974, now abandoned.

BACKGROUND OF THE INVENTION

1. Field of the Invention

The present invention relates to dried semi-permeable membranes which are used especially as reverse osmosis membranes or as ultrafilters. More particularly, the dried semi-permeable membranes of the present invention are fabricated of polyacrylonitrile or acrylonitrile copolymers which can be stored under dry conditions.

2. Description of the Prior Art

The use of semipermeable membranes for the desalination of sea water, the desalination of brackish water, the treatment of industrial food industry wastes and the like by reverse osmosis or ultrafiltration is well documented. The selective permeability of the semi-permeable membranes is a very important property in the technology for the separation of solution components by the membranes. Especially desired are semi-permeable membranes which inhibit the permeation of a solute but readily permit the permeation of the liquid medium (e.g. water) in the separation process. Certain semi-permeable membranes have been disclosed such as the cellulose-acetate membranes disclosed in Japanese Patent Publication No. 2818/1967, the polyamide semi-permeable membranes disclosed in Japanese Patent Publication No. 21885/1971, and the polyacrylonitrile semi-permeable membranes disclosed in Japanese Patent Publication No. 4625/1972.

From the viewpoint of use of the semi-permeable membranes it is preferable that the membranes have high mechanical strength so that they may be easily used. However, the above-mentioned conventional semi-permeable membranes must be stored under wet conditions and cannot be used if the membranes are allowed to dry even once because the characteristics of the membranes are substantially and irreversibly changed. Accordingly, when a reverse osmosis apparatus or an ultrafiltration apparatus is assembled with one of the conventional semi-permeable membranes, the semi-permeable membrane should be maintained under wet conditions without failure. Because of this requirement, the apparatuses are disadvantaged by the difficulties of bonding the semi-permeable membrane and the apparatus which is a serious problem and by the special precautions required for the transportation and storage of the semi-permeable membrane. When a solution containing a certain solute is treated with a semi-permeable membrane, high water permeation velocities are necessary through the semi-permeable membrane and the permeation of the solute through the membrane must be prevented as much as possible in order to attain an effective industrial process. In order to achieve high water permeation velocities, it is preferable to decrease the thickness of the semi-permeable membrane. Conversely, in order to maintain high mechanical strength of the membrane, the thickness of the semi-permeable membrane is preferably increased. An asymmetrical semi-permeable membrane having a thin, dense surface layer and an inner layer of an open-celled structure, which has low resistance to water-permeation, has both of the desired properties of high mechanical strength and high water permeability. If the thin, dense surface layer is complete in the asymmetrical semi-permeable membrane, it can be used as a reverse osmosis membrane which can remove low molecular weight solutes. On the other hand, if the thin, dense surface layer is incomplete and has many fine pores, it can be used as an ultrafiltration semi-permeable membrane.

In order to increase the rate of water permeation and to increase the mechanical strength of the membrane, most portions of the semi-permeable membrane should have a porous structure. In an open-celled structure, the pores should communicate, but no cellular voids should be present in the structure so that the proper mechanism for water permeation is operative. Water is kept within the porous portions (open-celled structure) of the porous semi-permeable membranes. If water is removed from the porous portions, the semi-permeable membranes usually deform and their original structure cannot be recovered even though the dried membranes are immersed in water. The well known cellulose-acetate semi-permeable membranes have this irreversible property. Polyacrylonitrile semi-permeable membranes which are hydrophobic compared to the cellulose-acetate membranes also have the same irreversible property. Japanese Patent Application Publication No. 6257/1972 shows that semi-permeable membranes should be kept under moist conditions or maintained by impregnating the membranes with a hydroscopic plasticizer in order to store the semi-permeable membrane.

A need, therefore, continues to exist for semi-permeable membranes which do not have to be stored under moist conditions.

SUMMARY OF THE INVENTION

Accordingly, one object of the present invention is to provide a dry semi-permeable membrane whose membrane properties are reversible upon immersion in water.

Another object of the present invention is to provide a method of manufacturing a polyacrylonitrile semi-permeable membrane which is reversible in water by heat-treating the same under moist conditions at a suitable temperature and then drying the membrane at a suitable temperature.

Briefly, these objects and other objects of the present invention as hereinafter will become more readily apparent can be attained by semi-permeable membranes made of polyacrylonitrile or a copolymer containing more than 65 wt. % of acrylonitrile which has an open-celled structure with a pore size of a diameter of less than $0.5\mu$ and a porosity of 0.4–0.7, by dissolving the polyacrylonitrile or the copolymer in a solvent to prepare a concentrated solution and casting the solution to form a membrane under the conditions of 60–85% relative humidity, immersing the membrane in a non-solvent to remove the solvent and heat-treating the membrane under moist conditions at 50°–90° C and then drying the membrane at a temperature less than the temperature of the heat treatment under conditions such that the coefficient of contraction is less than 1%.

DETAILED DESCRIPTION OF THE PREFERRED EMBODIMENTS

The polymers used for the preparation of the semi-permeable membrane include polyacrylonitrile or a copolymer of acrylonitrile having more than 65 wt. %, preferably 85–99 wt. %, of the acrylonitrile component. Suitable comonomer components for the copolymer include one or more well known copolymerizable monomers which include non-ionic monomers such as acrylamide, diacetone acrylamide, N-vinyl-2-pyrrolidone, hydroxyethyl methacrylate, methyl acrylate, butyl acrylate, vinyl acetate, and the like; anionic monomers such acrylic acid, methacrylic acid, methacryl sulfonic acid, vinyl benzenesulfonic acid and salts thereof; and cationic monomers of tertiary amines such as 2-vinyl and 4-vinyl pyridine; dimethylaminoethyl methacrylate and quaternary amine salts prepared by alkylation of the tertiary amine. When the amount of the acrylonitrile component in the copolymer is less than 65 wt. %, the water permeation velocity of the resulting semi-permeable membrane cannot be obtained.

The copolymerization of acrylonitrile and the comonomer can be easily performed by any conventional method. The degree of polymerization of the polymer should be high enough to form a film and to give it considerable mechanical strength. Polyacrylonitrile or a copolymer of acrylonitrile having more than 65 wt. % of the acrylonitrile component show the above properties, if the weight average degree of polymerization of the polymer is above about 1,000. The weight average degree of polymerization for the polymer used in this invention is above 1,000, preferably 1,500 – 3,000 as measured by the light-scattering method.

Polyacrylonitrile or a copolymer of acrylonitrile is dissolved in a solvent to prepare a concentrated solution thereof. The concentration of the polymer is preferably in a range of 15–30 wt. %. Suitable solvents include those which dissolve the polymer at the desirable concentration and include polar organic solvents such as dimethyl formamide (DMF), dimethylacetamide (DMAC), dimethylsulfoxide (DMSO), and the like, which are suitable solvents for polyacrylonitrile. It is also possible to use inorganic solvents such as nitric acid, a solution of sodium thiocyanate, or the like.

In the preparation of a membrane a flat plate is uniformly coated with a concentrated solution of the polymer under an atmosphere whose relative humidity is 60–85%. Then, the membrane is immersed in a prepared non-solvent. Suitable non-solvents include water and mixtures of water and dimethylacetamide, dimethylformamide, dimethylsulfoxide and mixtures thereof. It is permissible to allow a portion of the solvent to evaporate in the time from when the plate is coated with the solution until the plate is immersed in the non-solvent. The evaporation of the solvent is not indenspenable. The structure of the dense surface layer is determined by the manner in which the solvent is evaporated. The non-solvent should coagulate the concentrated solution of the polymer and is preferably water or a water miscible medium. According to electro-microscopic observations of the sectional surface of the resulting semi-permeable membrane, a porous structure is obtained which has communicating holes having a diameter less than $1\mu$. The porosity of the semi-permeable membrane is usually less than 0.8, and is defined by the equation $$\text{porosity} = W_1/(W_0 + W_1)$$

wherein $W_1$ is the weight of the water present in the membrane and
$W_0$ is the weight of the dried membrane.

When the resulting semi-permeable membrane of the present invention is dried, the structure of the membrane changes substantially. Accordingly, it is difficult to store and handle the membrane under dry conditions. However, the structure of the membrane can be set by heat-treating the semi-permeable membrane under moist conditions, preferably in hot water and is not substantially changed by the subsequent drying step. The temperature of the heat treatment is in the range of 50°–90° C. If the temperature is less than 50° C, the structure of the membrane does not set sufficiently to give a stable, dry semi-permeable membrane. If the temperature is higher than 90° C, the porosity of semi-permeable membrane is too low and the water permeation velocity greatly decreases. During the heat treatment the membrane can be kept at a constant length, stretched or allowed to expand or contract at will.

The porosity of the heat-treated semi-permeable membrane is in the range of 0.4–0.7 and the average diameter of the pores is less than $0.5\mu$. The resulting semi-permeable membrane is wet. In order to obtain a dry semi-permeable membrane, it is necessary to dry the semi-permeable membrane at a temperature less than the temperature of the heat treatment while supporting the membrane so that the coefficient of contraction is less than 1%. If the drying temperature is higher than the temperature of the heat treatment, the structure of the membrane is changed in the drying step which results in a decrease of the porosity of the membrane or deformation of the membrane structure. The membrane which is dried at a temperature less than the temperature of the heat treatment shows no substantial change in porosity and exhibits the original degree of semi-permeablility when the dried membrane is immersed in water. When the membrane is used as an ultrafiltration semi-permeable membrane for treating a solution of bovine-serum albumin under a pressure of 1.5 atms, the rejection rate of the solute is 100% and the flux of the permeated solution is 1–30 $g f d$ [gal/(feet)$^2$ × day]. When the membrane is used as a reverse osmosis semi-permeable membrane in the treatment of solutions of potassium ferricyanide, the rejection rate of the solute is higher than 90% and the flux of the permeated solution is 5–40 $g f d$ [gal/(feet)$^2$ × day].

It is possible to dry the membrane immediately after the heat treatment. The preparation procedure described for the semi-permeable membrane is for flat membranes, however, other shaped membranes such as tube shaped and hollow fiber membranes can also be prepared by similar methods.

A film made of an acrylonitrile containing polymer having a porosity of substantially zero is known. The structure of the film is not changed by drying, and the characteristics of the semi-permeable membrane are not substantially attained. It is possible to form voids in the inner structure of the membrane film of the present invention by stretching the film. However, it is hard to achieve a membrane having pores of a uniform diameter, and either a film having a low void degree of porosity and low water permeation velocity or a film having large pores and high water permeation velocity but having no rejection properties to the solute is obtained. Accordingly, the film cannot be used as a semi-permeable membrane. The dried semi-permeable membranes of the present invention are very different from the conventional membranes.

Having generally described this invention, a further understanding can be obtained by reference to certain specific examples which are provided herein for purposes of illustration only and are not intended to be limiting unless otherwise specified.

EXAMPLE 1

A copolymer of 93 wt. % acrylonitrile and 7 wt. % vinyl acetate was dissolved in dimethylacetamide to form a 23 wt. % solution. The solution was coated onto a glass plate by an applicator and immediately thereafter it was dipped into a bath for 10 minutes. The bath was a mixture of dimethylacetamide and water in a ratio of 20 : 80 and kept at 40° C. The resulting semi-permeable membrane was washed with water and was heat-treated in hot water at 75° C for 10 minutes while being maintained at a constant length.

The resulting heat-treated membrane and a non-heat-treated membrane as a reference were dried at room temperature for 5 days. The dried semi-permeable membranes were dipped again in water, and the characteristics of the semi-permeable membranes were measured. In the reverse osmosis tests, a 0.5% solution of potassium ferricyanide was treated under a pressure of 40 atms, and the amount of water which permeated through the membrane was measured and the concentration of potassium ferricyanide in the permeated water was measured by electro-conductivity and the rejection rate (%) of the solute was calculated. The porosity of the membrane was calculated by measuring the weight of the membrane before and after drying.

The porosity of the heat-treated membrane was 0.515 and the structure of the membrane was not changed after the drying step.

Accordingly, the reverse osmosis test could be achieved by using the heat-treated membrane, and the water permeation velocity was 18 $g f d$ [gal/(feet)$^2$ · day] and the rejection rate of the solute was 95%. The characteristics were the same with those of the membrane before drying. On the other hand, the porosity of the non-heat-treated membrane was 0.670 before drying. However, the membrane was deformed by the drying step and the tests could not be performed.

REFERENCE EXAMPLE 1

A commercial cellulose-acetate reverse osmosis membrane was dried at room temperature for 5 days. The dried membrane was contracted and deformed. When the dried membrane was dipped in water, the membrane did not recover and the reverse osmosis test could not be performed. Incidentally, the porosity of the semi-permeable membrane was 0.696 before drying.

EXAMPLE 2

The concentrated solution of the polymer of Example 1 was coated onto a glass plate and was kept at room temperature for 10 minutes, and thereafter was dipped into the bath of Example 1 for 10 minutes. The resulting semi-permeable membrane was washed with water, and was heat-treated in hot water at 70° C for 10 minutes while maintained at constant length. The resulting heat-treated membrane and non-heat-treated membrane as a reference were dried at room temperature for 5 days. The dried semi-permeable membranes were dipped again in water, and an ultrafiltration test was performed. In the ultrafiltration test, a 0.5% solution of bovine-serum albumin was treated under the pressure of 1.5 atms and the permeation velocity of the solution through the semi-permeable membrane and the concentration of the solute in the permeated solution was measured. The concentration of the solute was measured by an absorptiometric method. The characteristics of the heat-treated membrane did not change after drying, and the water permeation velocity was 15.3 $g f d$ and the rejection rate of the bovine-serum albumin was 100%. On the other hand, the non-heat-treated membrane was substantially deformed by the drying and the ultrafiltration test could not be performed.

The porosity of the membranes before drying was 0.550 for the heat-treated membrane and 0.720 for the non-heat-treated membrane.

REFERENCE EXAMPLE 2

The porosity of a commercial cellulose-acetate membrane for ultrafiltration was 0.682. The ultrafiltration test stated in Example 2 was performed by using the commercial semi-permeable membrane. As a result, the permeation velocity was 20.2 $g f d$ and the rejection rate of the bovine-serum albumin was 100%, However, when the semi-permeable membrane was dried at room temperature for 5 days, the membrane substantially contracted. When the dried membrane was dipped in water, the membrane did not recover and the ultrafiltration test could not be performed.

EXAMPLES 3 – 5 AND REFERENCE EXAMPLE 3

Acrylonitrile type copolymers containing a methacrylate component were prepared by copolymerizing 3.5 – 38.6 wt.% of methyl acrylate with the acrylonitrile. These copolymers were dissolved in dimethyl formamide to form 20% solutions. The concentrated solutions were coated onto glass plates and immediately dipped in water at 20° C. The resulting semi-permeable membranes were washed with water and were heat-treated in hot water at 80° C for 10 minutes while being maintained at constant length.

The heat-treated membranes and the non-heat-treated membrane as a reference were dried in a drier at 50° C for 1 hour. The heat-treated membranes did not deform after the drying and the ultrafiltration test could be performed.

However, the non-heat-treated membrane was substantially deformed. When the dried non-heat-treated membrane was dipped into solution, it could not be recovered and the ultrafiltration test could not be performed.

In Table 1, the porosities of the semi-permeable membranes before drying and the ultrafiltration test results of the membranes prepared by drying and recovery in water are shown. The conditions of the ultrafiltration tests are the same as those of Example 2.

TABLE 1

| Ex. | Heat treatment | Methyl acrylate wt. % in the copolymer | Porosity | Water permeation velocity (gfd) | Inhibition of bovine-serum albumin |
|---|---|---|---|---|---|
|  | None | 3.5 | 0.698 | deformation of membrane | |
| 3 | Do | 3.5 | 0.485 | 13.7 | |

TABLE 1-continued

| Ex. | Heat treatment | Methyl acrylate wt. % in the copolymer | Porosity | Water permeation velocity (gfd) | Inhibition of bovine-serum albumin |
|---|---|---|---|---|---|
| | None | 11.6 | 0.721 | deformation of membrane | |
| 4 | Do | " | 0.450 | 10.9 | 100 |
| | None | 24.3 | 0.663 | deformation of membrane | |
| 5 | Do | " | 0.489 | 6.50 | 100 |
| Reference 3 | None | 38.6 | 0.313 | 0.53 | 100 |
| | Do | " | 0.300 | 0.41 | 100 |

EXAMPLE 6

An acrylonitrile copolymer containing 93 wt.% acrylonitrile and 7 wt. % vinylacetate was dissolved in dimethylacetamide (DMAC) to form a 23% solution. The concentrated solution was cast over the surface of a glass plate by an applicator, and immediately dipped into a bath for 10 minutes. During the casting of the solution on the glass plate, the relative humidity in the atmosphere was controlled by varying the temperature and water in the chamber. The bath contained DMAC and water in a ratio of 20 to 80 by weight and was kept at 40° C.

The resulting semi-permeable membrane was washed with water and was heat-treated in a hot water bath at 70° C for 10 minutes while maintained at a constant length. The resulting heat-treated membrane was dried at room temperature for 24 hours and a dried semi-permeable membrane was obtained.

An ultrafiltration test on the semi-permeable membrane was performed by using an ultrafiltering apparatus (MC-2 type; manufactured by Bioengineering Co., Ltd.) and a 0.1% aqueous solution of dextran (average molecular weight of 40,000) under a pressure of 2 atm. The results are shown in Table 2.

TABLE 2

| Nature of atmosphere in casting step | | | Water permeation velocity (gfd) | Inhibition of dextran (%) |
|---|---|---|---|---|
| dry-bulb temperature (° C) | wet-bulb temperature (° C) | Relative humidity (%) | | |
| 17.0 | 11.1 | 43 | 2.30 | 95.0 |
| 16.0 | 11.1 | 50 | 2.60 | 95.0 |
| 21.1 | 16.1 | 57 | 5.70 | 95.0 |
| 30.1 | 25.1 | 65 | 15.30 | 94.9 |
| 29.2 | 26.2 | 78 | 19.10 | 95.0 |
| 30.1 | 28.1 | 85 | 19.40 | 94.5 |
| 40.1 | 38.2 | 88 | 25.60 | 52.0 |

The data in the Table shows that when the relative humidity of the atmosphere is lower than 60L%, the water permeation velocity through the product membrane is quite low. On the other hand, when the relative humidity is higher than 85%, the inhibition of dextran is quite low.

EXAMPLE 7

In accordance with the process of Example 6, individual solutions of the copolymer at concentrations of 23%, 20%, or 18% were prepared and semi-permeable membranes were prepared from each solution under humidity conditions of 78% during the casting step. Each heat-treated wet membrane obtained from the above solutions was cut into several discs each having a diameter of 55 mm. Discs from each of the membranes were dried by one of the following procedures.

1. Air drying at room temperature (26° C) for 24 hours.
2. Air drying in a hot air oven at 60° C for 30 minutes.
3. Drying in a hot air oven at 60° C for 30 minutes under a constant length.

In procedures (1) and (2), the discs were allowed to freely contract. In procedure (3), each disc membrane was set in a metal frame to prevent contraction of the disc. The coefficients of contraction of the disc membranes were measured.

The ultrafiltration test of Example 2 using a 0.5% solution of bovine-serum albumin was conducted with each of prepared disc membranes. The results are shown in Table 3.

TABLE 3

| Concentration of copolymer in concentrated solution | Drying condition | Coefficient of contraction | Water permeation velocity (gfd) | Inhibition of bovine-serum albumin |
|---|---|---|---|---|
| 18 | (1) | 0.55 | 85.0 | 90.3 |
| " | (2) | 1.27 | 21.0 | 90.3 |
| " | (3) | 0 | 113.0 | 90.2 |
| 20 | (1) | 0.63 | 49.5 | 95.1 |
| " | (2) | 1.20 | 10.7 | 95.1 |
| " | (3) | 0 | 52.6 | 95.0 |
| 23 | (1) | 0.75 | 19.0 | 100.0 |
| " | (2) | 1.31 | 2.3 | 100.0 |
| " | (3) | 0 | 23.1 | 100.0 |

The results in Table 3 show that the more a membrane is allowed to contract, the lesser will be the water permeation velocity.

EXAMPLE 8

The process of Example 7 was repeated, except that the temperature in the heat-treatment and the drying conditions were varied.

| Concentrated solution: | 20 wt.% |
|---|---|
| Humidity during casting: | 80 % |
| Drying Conditions: | at room temperature 26° C free contraction constant length. |

TABLE 4

| Temperature for heat-treatment | Drying conditions | Coefficient of contraction (%) | Water permeation velocity (gfd) | Inhibition of bovine-serum albumin |
|---|---|---|---|---|
| 50 | free | 9.30 | 2.5 | 96.3 |
| " | constant | 0 | 3.6 | 96.1 |
| 60 | free | 5.10 | 4.7 | 96.0 |
| " | constant | 0 | 5.1 | 96.0 |
| 65 | free | 2.10 | 6.1 | 95.5 |
| " | constant | 0 | 60.0 | 95.0 |
| 75 | free | 0.45 | 40.5 | 95.0 |
| " | constant | 0 | 43.1 | 95.0 |

The data in Table 4 show that when the heat-treatment temperature is low, the coefficient of contraction was greater than 1% even though the membrane was dried at room temperature under free contraction conditions and the water permeation velocity was not high.

EXAMPLE 9

The process of Example 6 was repeated except that the relative humidity was varied under the following conditions:

| Concentrated solution: | 18 wt. % |
|---|---|
| Temperature for heat-treatment | 70° C |
| Drying conditions: | at room temperature free contraction. |

TABLE 5

| Nature of atmosphere in casting step | | | Water permeation velocity (gfd) | Inhibition of dextran (%) |
|---|---|---|---|---|
| dry-bulb temperature (° C) | wet-bulb temperature (° C) | Relative humidity (%) | | |
| 17.0 | 11.1 | 43 | 30.6 | 91.6 |
| 16.0 | 11.1 | 50 | 33.4 | 91.5 |
| 21.1 | 16.1 | 57 | 37.7 | 91.5 |
| 30.1 | 25.1 | 65 | 80.0 | 91.2 |
| 29.2 | 26.2 | 78 | 85.0 | 90.3 |
| 30.1 | 28.1 | 85 | 86.1 | 90.2 |
| 40.1 | 38.2 | 88 | 115.0 | 63.5 |

The above results show that the structure of the surface of the membrane is changed by varying the relative humidity in the casting step. The structure of the membrane is further varied by dipping the cast membrane in the non-solvent followed by the heat treatment. This is evident by the difference in the membrane before and after the dipping and heat-treating steps.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a process for preparing a dry semi-permeable membrane fabricated of polyacrylonitrile or a copolymer containing more than 65 weight % of acrylonitrile, the improvement which comprises:
   contacting the polymer with a polar organic solvent selected from the group consisting of dimethylformamide, dimethylacetoamide, dimethylsulfoxide and mixtures thereof in a solids concentration of 15–30% by weight;
   uniformly coating the solution onto a surface in a desired shape under an atmosphere having a relative humidity of 60–85% and dipping said coated surface into a non-solvent medium so as to remove the solvent which forms the membrane;
   heat-treating the membrane in water at 50°–90° C; and
   drying the membrane at a temperature less than the temperature of the heat treatment under conditions such that the coefficient of contraction of said membrane is less than 1%, whereby a dried semi-permeable membrane having an open celled structure with a pore size of diameter less than $0.5\mu$ and a porosity of 0.40–0.7 is obtained.

2. The process of claim 1, wherein the heat treatment of the membrane is performed in hot water at 65°–90° C while maintained at constant length.

3. The process of claim 2, wherein the membrane is dried from room temperature to the temperature of the heat treatment.

4. The process of claim 1, wherein said copolymer contains 85–99 wt. % of acrylonitrile and 15–1 wt. % of at least one comonomer.

5. The process of claim 1, wherein the polymer is dissolved in a solvent in a solids concentration of 18–25% by weight.

6. The process of claim 5, wherein the solvent is dimethyl acetamide, dimethyl formamide, dimethyl sulfoxide or mixtures thereof.

7. The process of claim 1, wherein the non-solvent medium is water.

8. The process of claim 1, wherein the non-solvent medium is a mixture of water and dimethyl acetamide, dimethyl formamide, dimethyl sulfoxide or mixtures thereof.

9. The process of claim 8, wherein said non-solvent is a mixture containing 40–99 wt.% water.

10. The process of claim 1, wherein a portion of the solvent in the solution coated on the surface is evaporated and then the product is dipped into the non-solvent medium.

11. The process of claim 10, wherein the heat treatment is conducted in hot water at 70°–90° C while the membrane is maintained at a constant length.

12. A dry semi-permeable membrane prepared by a process, which comprises the steps of:
   contacting polyacrylonitrile or a copolymer containing more than 65 weight % acrylonitrile with a polar organic solvent selected from the group consisting of dimethylformamide, dimethylacetoamide, dimethylsulfoxide and mixtures thereof in a solids concentration of 15–30% by weight;
   uniformly coating the solution onto a surface in a desired shape under an atmosphere having a relative humidity of 60–85% and dipping said coated surface into a non-solvent medium so as to remove the solvent which forms the membrane;
   heat-treating the membrane in water at 50°–90 ° C; and
   drying the membrane at a temperature less than the temperature of the heat treatment under conditions such that the coefficient of contraction of said membrane is less than 1%, whereby a dried semi-permeable membrane having an open-celled structure with a pore size of a diameter less than $0.5\mu$ and a porosity of 0.40–0.7 is obtained.

* * * * *